June 26, 1934.  F. HUMPHRIS  1,964,665
PRESS AND OTHER PRESSURE EXERTING MACHINE
Filed Sept. 2, 1927  5 Sheets-Sheet 1

INVENTOR
Frank Humphris
BY
ATTORNEY

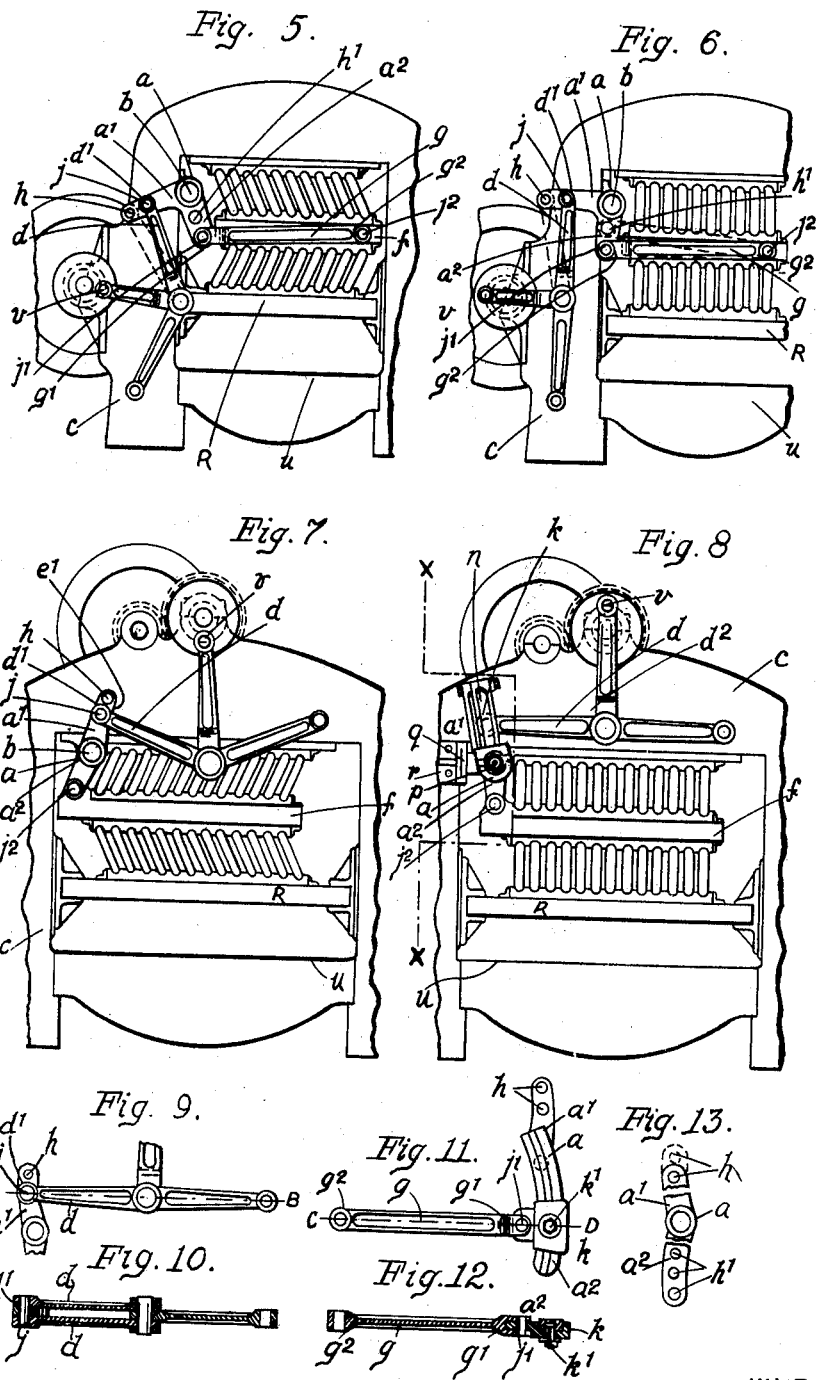

June 26, 1934.  F. HUMPHRIS  1,964,665
PRESS AND OTHER PRESSURE EXERTING MACHINE
Filed Sept. 2, 1927  5 Sheets-Sheet 3
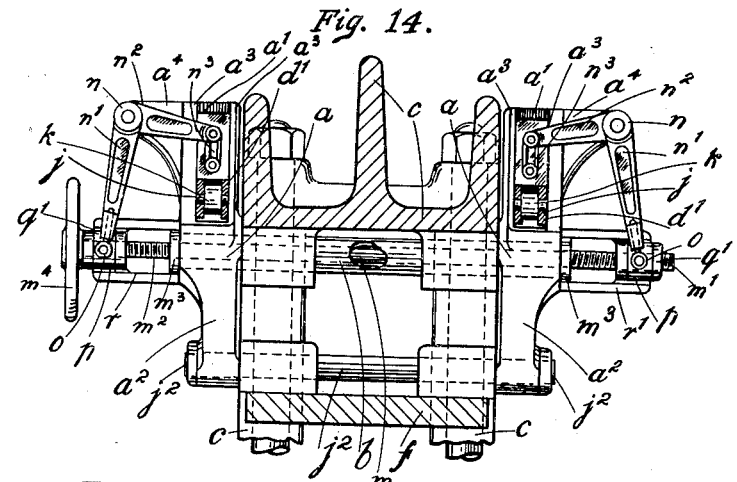
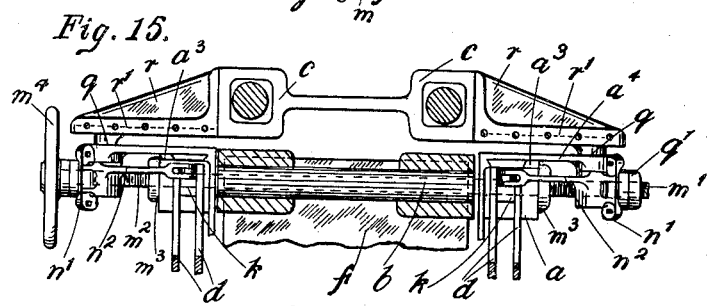
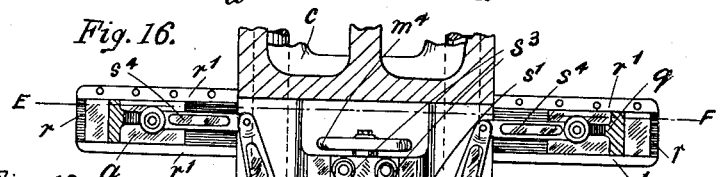
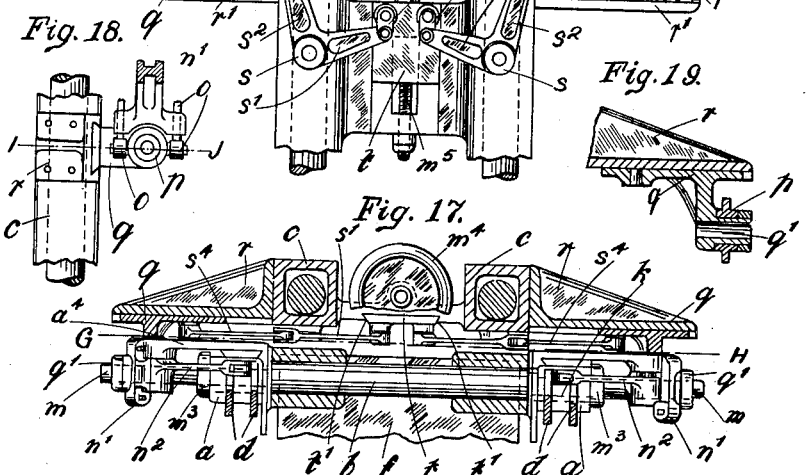

June 26, 1934.　　　　F. HUMPHRIS　　　　1,964,665
PRESS AND OTHER PRESSURE EXERTING MACHINE
Filed Sept. 2, 1927　　　5 Sheets-Sheet 4
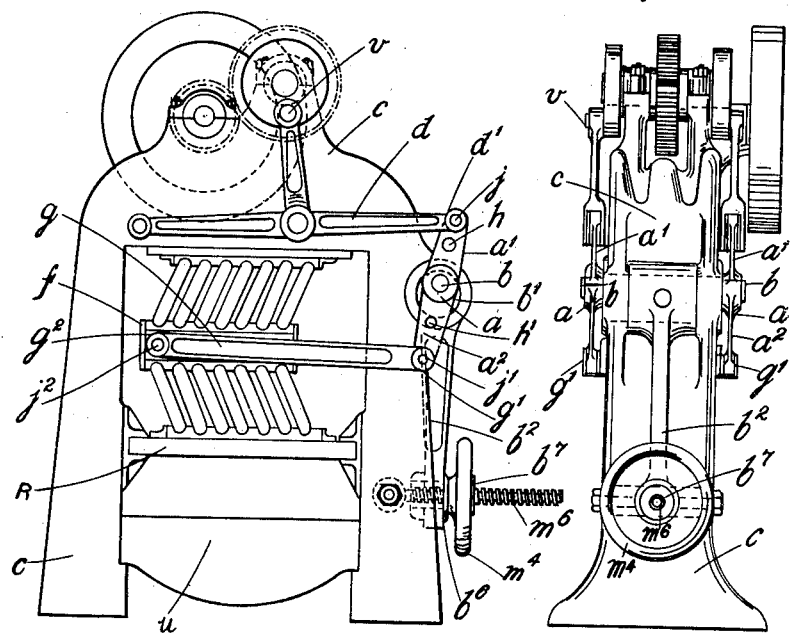
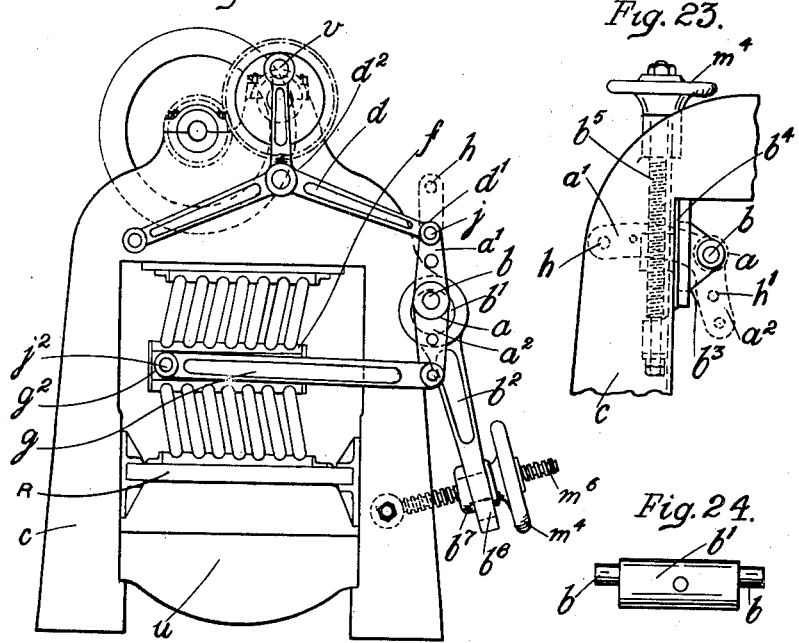
INVENTOR
Frank Humphris
BY
ATTORNEY

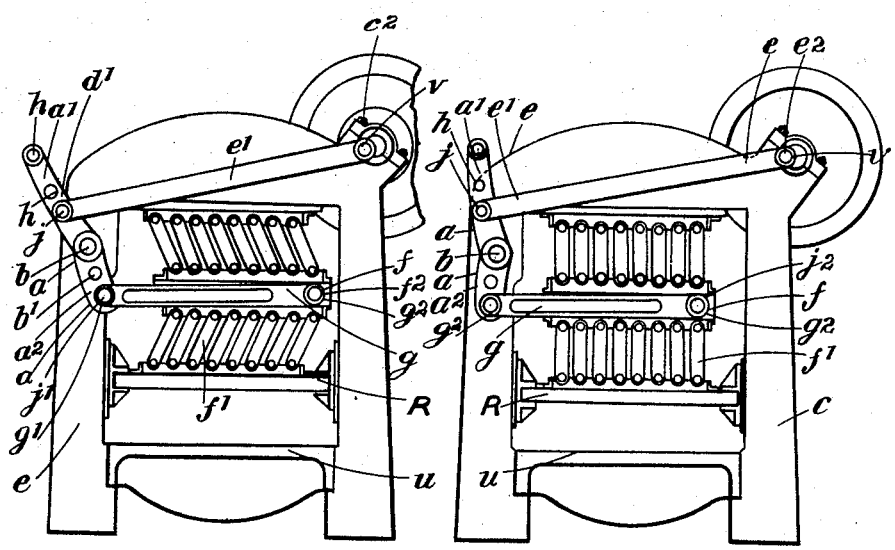

Patented June 26, 1934

1,964,665

UNITED STATES PATENT OFFICE 1,964,665

PRESS AND OTHER PRESSURE EXERTING MACHINES

Frank Humphris, Parkstone, England

Application September 2, 1927, Serial No. 217,254
In Great Britain May 24, 1927

6 Claims. (Cl. 78—41)

This invention relates to improvements in presses and other pressure-exerting machines and consists in providing means by which the length of the stroke or of the distance travelled by a ram-member of a press or pressure-exerting machine can be varied and is particularly applicable for making an adjustment or variation in the stroke of the ram-member of so-called toggle-presses of the known kind in which such ram-member is constrained to reciprocate as the result of motion imparted to it by so-called oscillating plates or levers, knee-levers, edge-pressure plates or links, which are arranged in such toggle-press in a toggle-wise manner and are actuated by one or more so-called knuckle-pieces, slides, draft-bars, reciprocating-bearer-plates or the like of the known kind, hereinafter referred to as the reciprocating-bearer-plate. The invention will be described hereinafter as applied to so-called toggle-presses of the known kind in which the ram-member is reciprocated by edge-pressure-plates or links arranged to operate either on one or on both sides of a reciprocating-bearer-plate and so that when a reciprocating motion of the said reciprocating-bearer-plate occurs the ram-member moves in a direction approximately at right angles to that of the reciprocating-bearer-plate.

An object of this invention is to provide at one or both sides, or in the centre, or in any other suitable position on, or in presses and other pressure-exerting machines, hereinafter called the press, as an essential integer or element thereof, one or more so-called intermediate-levers pivotally-mounted on one or more fulcrums, pins or shafts as the case may be, about or with which the said intermediate-lever oscillates. Such intermediate-lever has two arms one or both of which are provided either with a number of pivot-holes therein or with a slidably mounted pivot-hole attachment thereon, or one of said arms is provided with a number of pivot-holes and the other arm is provided with a slidably-mounted pivot-hole attachment, and such intermediate-lever is so formed and mounted in the said press that the position where it is pivotally-connected may be varied or changed whilst the press is at rest, or by means of screw-threaded members, levers, slides and the like, which either actuate pivot-hole attachments slidably mounted on one or both arms of the said intermediate-lever, or move the fulcrum of the intermediate-lever thus changing its pivotal positions in such a manner that it will effect an increase or a decrease in the distance travelled by the reciprocating bearer-plate and the ram-member whilst the said press is operating or in motion.

A further object in this invention, is within the ambit of variation permitted by the intermediate-lever, to adjustably control the length and extent of stroke made by the ram-member of a press, so that the said ram-member is constrained to complete its pressure-exerting stroke at any desired distance from the bed or bolster of the press and whilst the said press is operating or in motion.

In all forms of carrying this invention into effect variation of the stroke or of the distance travelled by the ram-member and reciprocating bearer-plate is effected, without varying the stroke of the cranked or equivalent driving-elements of the press, by altering the pivotal positions on each intermediate-lever, or by altering the pivotal-position of the fulcrum of each intermediate-lever, or by altering both, in such a manner that the stroke of the ram-member is either varied while the position it reaches at the end of its pressure-stroke is always the same distance away from the bolster of the press, or in such a manner that the stroke or travel of the ram-member is controlled and reaches the end of, or completes its pressure-stroke at any desired distance from the bolster of the press, irrespective of the length of the stroke of the said ram-member.

According to this invention the hereinbefore referred to intermediate-lever must be interposed so as to couple an auxiliary toggle-mechanism or a connecting rod and a reciprocating-bearer-plate or its equivalent, or so as to couple an auxiliary toggle-mechanism or a connecting-rod and a coupling-link pivotally-mounted to a reciprocating-bearer-plate or its equivalent.

Hitherto in known forms of pressure-exerting machines in which a cranked-element or its equivalent imparts motion to the ram-member thereof, the position and distance away from the bolster of the ram-member at the end of its pressure-stroke has been obtained by the employment of screw-threaded members coupling the crank and the ram-member together, but this method does not vary the stroke of the ram-member and only effects a change in the relative position and distance of the said ram-member away from the bolster and this change in position or distance is made whilst the said ram-member is stationary.

The pitch-circle of the pivot-holes, or the curve of the guides on the arms of any intermediate-levers employed according to this invention, are preferably but not necessarily concentric with the axis of the crank-pin, auxiliary toggle-mechanism centre-joint or coupling-link pin about which the connecting-rod, arm of the auxiliary toggle-mechanism, or the coupling-link would turn if disconnected from the intermediate-lever when the ram-member is at the bottom of its pressure-stroke.

The invention will now be described with reference to the accompanying drawings, in which.

Figure 3:
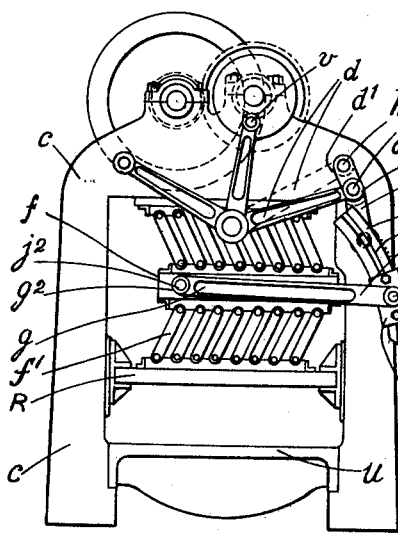

Figure 3 is an elevational view of a press showing the ram-member at the top of its stroke and how the intermediate lever is provided with pivot holes in one arm and has a pivot-hole attachment slidably mounted on the other arm thereof which is coupled to one end of a coupling-link, the other end thereof being connected to a reciprocating-bearer-plate. Another pivotal-position on one arm of the intermediate-lever into which one arm of the auxiliary toggle-mechanism may be changed is indicated in dotted lines.

Figure 4:
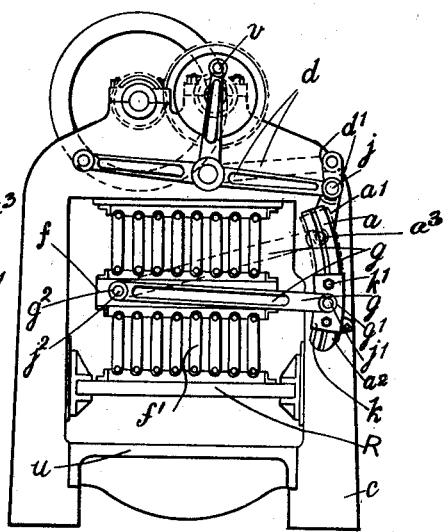

Figure 4 is an elevational view of the press illustrated in Figure 3 and shows the ram-member at the bottom of its pressure-stroke. Another pivotal-position into which one arm of the auxiliary toggle-mechanism may be moved and also how the pivot-hole attachment and its coupling-link may be moved to a position where no movement is imparted to the ram-member when the intermediate lever is oscillated is indicated in dotted lines. It will be obvious that the stroke of the ram-member can be varied from zero, or no movement, to its maximum movement, by sliding the pivot-hole attachment away from the fulcrum of the intermediate-lever.

Figure 5 is an elevational view of part of a press showing the ram at the top of its stroke, in which an intermediate-lever of L-form or elbow-form having pivot-holes provided in each arm thereof is used and the auxiliary toggle-mechanism, connecting-rod and its actuating mechanism is mounted at, or on the side of the press. This view also shows in dotted lines how one arm of the auxiliary toggle-mechanism can be coupled to the intermediate-lever at another pivot-hole to obtain a different stroke of the ram-member.

Figure 6 is an elevational view of part of the press illustrated in Figure 5, with the ram at the bottom of its stroke. Dotted lines show how one arm of the auxiliary toggle-mechanism and the coupling-link can be coupled to other pivot-holes in the arms of the intermediate-lever to obtain a different stroke of the ram-member.

Figure 7 is an elevational view of part of a press, with the ram at the top of its stroke. In this case one arm of the intermediate lever is pivotally-attached to the reciprocating-bearer-plate and the other arm which is provided with pivot-holes is pivotally-connected to one arm of an auxiliary toggle-mechanism.

Figure 8 is an elevational view of part of a press of the kind illustrated in Figure 7, with the ram at the bottom of its stroke. In this modification the intermediate-lever has one arm connected to the reciprocating-bearer-plate, its other arm being provided with guides in which a mechanically-controlled pivot-hole attachment is slidably-mounted and to which one arm of the auxiliary toggle-mechanism is pivotally coupled. The details of this intermediate-lever are clearly illustrated in Figures 14 to 19 of the drawings.

Figure 9 is a view of part of the auxiliary toggle-mechanism and part of the intermediate-lever as illustrated in Figure 7.

Figure 10 is a sectional view on the line A—B of Figure 9.

Figure 11 is a view of an intermediate lever of the kind shown in Figures 3 and 4 and upon which the pivot-hole attachment is slidably mounted so that it can be moved along the curved arm of the said intermediate-lever and locked in position by a clamp bolt. A coupling-link is shown pivotally-connected to the pivot-hole attachment.

Figure 12 is a sectional view on the lines C—D of Figure 11.

Figure 13 is a view of an intermediate lever of the kind having pivot-holes provided in both arms thereof.

Figure 14 is an end elevation of a press on the line X—X, Figure 8, partly in section to illustrate how the pivot-hole attachments can be simultaneously moved along the arms of the two intermediate-levers one on each side of the press, by means of L-form levers which are pivotally mounted on the arms of the intermediate-levers and are moved by bracket slides which engage with trunnioned ring-pieces thereon, the said bracket-slides being moved by a left and right-hand screw-threaded rod or shaft which is revolved by a hand-wheel or the like.

Figure 15 is a plan view of parts shown in Figure 14, with the press-bridge-piece removed, and the fulcrum-bearings and the column bolts shown in section.

Figure 16 is a sectional view taken on the line G—H, Figure 17 to illustrate another manner of moving the bracket-slides by means of elbow-levers, having one arm coupled by a link to a control-slide, and the other arm coupled by a link to a bracket-slide, the said control-slide being moved by a screw-threaded rod or shaft, rotated by a hand-wheel.

Figure 17 is a plan view partly in section on the line E—F, Figure 16. In this view the bridge-piece is removed but the fulcrum-shaft, the trunnioned ring-pieces, the bracket-slides, the slidably-mounted pivot-hole attachments, the L-form levers and other concomitants are included to illustrate more clearly the relative location of the respective parts.

Figure 18 is a view on an enlarged scale of part of an L-form lever to illustrate how it is connected to the trunnioned ring piece through the medium of slidably-mounted I-bars, pivoted on the trunnioned ring-piece which is mounted on the bracket-slide.

Figure 19 is a sectional view on the line I—J of Figure 18 and shows the bracket-slide, the trunnioned ring-piece thereon and the bracket guide-piece. This view is taken lengthwise of the bracket-slide.

Figure 20 is an elevational view of a press with the ram at the top of its stroke and shows an intermediate lever with pivot-holes in both arms thereof and with one arm pivotally connected to one arm of an auxiliary-toggle-mechanism and the other arm pivotally connected to a coupling-link. This view shows the intermediate-lever pivotally-mounted on a fulcrum eccentric to the axis of a wrist-plate, or of a shaft, such wrist-plate, or shaft, being rotationally movable by a lever which is moved backwards and forwards as required by a screw-threaded rod and hand-wheel so as to cause the wrist-plate or shaft to move the fulcrum of the intermediate-lever and so change the position of the ram-member at the end of its pressure stroke nearer to or further away from the bolster of the press.

Figure 21 is an end elevation of Figure 20 showing the relative location of the respective parts.

Figure 22 is an elevational view of the press shown in Figure 20 but with the ram in the position it would occupy at the bottom of its pressure-stroke when the wrist-plate or shaft is moved so as to carry the fulcrum of the intermediate-lever to the changed position, in which position it will be observed that the edge-pressure-plates do not become vertical.

Figure 23 is an elevational view of part of a press illustrating a slidably-mounted fulcrum bracket upon which an intermediate-lever of L-form is shown in dotted lines pivotally-mounted so that it can be moved by means of a screw-threaded shaft and thus alter or change the position of the fulcrum of the intermediate lever.

Figure 24 is a detail view of a shaft or wrist-plate of the kind used in Figures 20, 21, and 22, having the fulcrums of the intermediate-levers either mounted on or formed integral therewith.

Figure 1:
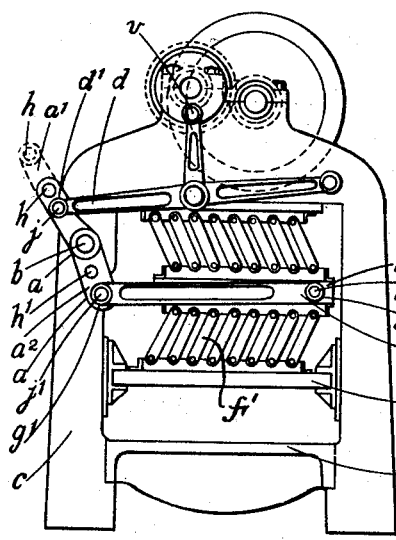
Figure 1 is an elevational view of a press showing the ram-member at the top of its stroke and how the intermediate-lever has pivot-holes in both arms thereof and how one arm thereof is coupled to one arm of an auxiliary toggle-mechanism and how the other arm thereof is coupled to one end of a coupling-link, the other end of which is connected to a reciprocating-bearer-plate.

Figure 25 shows in elevation a press similar to that shown in Figure 1, wherein the intermediate lever is connected directly to a cranked driving member by a connecting rod which can be attached to the said lever in alternative positions.

Figure 26 is a view of the press shown in Figure 25 with parts thereof in positions to which they are moved in the operation of the press.

Like letters of reference refer to like parts throughout the drawings.

One manner of carrying this invention into effect, as shown in Figures 7, 8 and 14 of the drawings, is by providing one or more intermediate-levers $a$ each of which is pivotally mounted so as to oscillate on, or about a fulcrum $b$ located on the said press; the arm $a^2$ of each intermediate lever $a$ is pivotally connected by a pin, bolt or the like $j^2$ to a reciprocating-bearer-plate $f$ the other arm $a'$ is provided either with a number of pivot-holes $h$ therein, or with a pivot-hole attachment $k$ (Figures 3 and 4) slidably mounted in guides $a^3$ thereon and into one of the said pivot-holes $h$, or into the hole in the pivot-hole attachment $k$, a pivot-pin, bolt or the like $j$ is placed and serves to connect the end $d'$ of the arm $d$ of an auxiliary toggle-mechanism to the arm $a'$ of the intermediate lever $a$, the other end $d^2$ of the arm $d$ being coupled in any suitable manner or by any known means, to a cranked element $v$ mounted on the frame $c$ of the press.

Where the arm $a'$ of the intermediate lever $a$ is provided according to this invention with a number of pivot-holes $h$, then a variation in the length of the stroke of the ram member R and in the stroke of the reciprocating bearer plate $f$ is obtained by coupling the end $d'$ of the arm $d$ of the auxiliary toggle mechanism to the arm $a'$ of the intermediate lever $a$ at a pivot-hole $h$ which is near to the fulcrum $b$ of the intermediate lever $a$, when a long stroke of the reciprocating bearer plate $f$ and the ram member R is required and further away from the said fulcrum $b$ when shorter strokes of the reciprocating bearer plate $f$ and the ram member R are required.

Where, according to this invention, the pivot-hole attachment $k$ is provided and slidably mounted on the arm $a$ as shown in Figure 3, or the arm $a^2$, as shown in Figure 11, or on both arms of the intermediate lever $a$, variation in the length of the stroke of the ram member R and in the stroke of the reciprocating bearer plate $f$ is obtained by moving one or both pivot-hole attachments $k$, as the case may be, along the arm $a'$ or the arm $a^2$, or both, of the intermediate lever $a$ on which it is, or they are slidably mounted, and when the desired stroke of the said ram member R and of the reciprocating bearer plate $f$ has been obtained, then such pivot-hole attachment $k$ is in each case secured against sliding movement by means of one or more bolts, screws or the like $k'$ and this slidably mounted pivot-hole attachment $k$ permits very small variations in its position on an arm of the intermediate lever $a$ to be made, thus enabling small degrees of variation to be made in the stroke of the ram member R and of the reciprocating bearer plate $f$.

Figure 2:
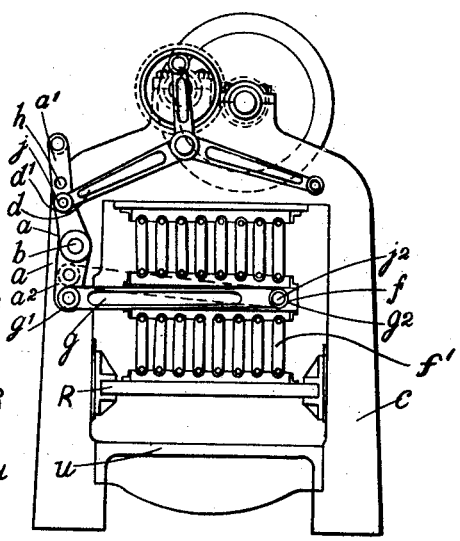
Figure 2 is an elevational view of a press of the kind illustrated in Figure 1 showing the ram at the bottom of its pressure-stroke.

When the arm $a'$ of the intermediate lever $a$ is connected to one end $d'$ of an arm $d$ of an auxiliary toggle mechanism, and the other arm $a^2$ of the said intermediate lever $a$ is provided with a number of pivot-holes $h'$ therein, a coupling link $g$, as shown for example in Figures 1 to 4 of the drawings, is employed and one end $g'$ thereof is pivotally connected to the arm $a^2$ of such intermediate lever $a$ at one of the pivot-holes $h'$ therein, as shown in Figures 1 and 2 of the drawings, or, where a pivot-hole attachment $k$ is slidably mounted on the arm $a^2$ of the lever $a$, as shown in Figures 3 and 4 of the drawings, the said coupling link $g$ is connected at one end to such plate $f$. The other end $g^2$ of the coupling link $g$ is pivotally mounted in any known manner by a pin, bolt or the like $j^2$ to the reciprocating bearer plate $f$.

Alternatively the intermediate lever $a$ may be actuated by connecting it as shown in Figures 25 and 26 to one end $e'$ of a connecting rod which at its opposite end $e^2$ is attached to a cranked member $v$ on the main driving shaft of the press. Rotation of the cranked member $v$ then causes an oscillatory movement of the lever $a$ which in turn effects a reciprocatory movement of the bearer plate $f$ transversely to the path of the ram member R, and this movement of the bearer plate acts through the edge pressure plates $f'$ by moving them to and from positions in which they are respectively oblique to or parallel to the path of movement of the ram member.

One manner of obtaining a variation in the stroke of the reciprocating bearer plate $f$ and of the ram member R is to change the position where the coupling link $g$ is pivotally connected to the arm $a^2$ of the intermediate lever $a$ either by connecting the end $g'$ of the coupling link $g$ at a different pivot-hole $h'$, or by moving it with the slidably mounted pivot-hole attachment $k$, where such is used, along the arm $a^2$ of the intermediate lever $a$; but in carrying this invention into effect, pivot-holes $h$ and $h'$, or pivot-hole attachments $k$ are optionally provided on one or both arms $a'$ and $a^2$ of the intermediate lever $a$, to suit various requirements, as the case may be.

When according to this invention two intermediate levers such as $a$ are employed and located one on each side of a press, then each is actuated and oscillated by an arm $d$ of an auxiliary toggle mechanism or the like, to which each is pivotally connected and the two intermediate levers $a$ are optionally mounted upon and rigidly connected together by means of a fulcrum-shaft or spindle $b$ with which they move rotationally, and when the slidably mounted pivot-hole attachments $k$ are provided on the arms $a'$ or $a^2$ thereof, or on both, the said pivot-hole attachments $k$ are simultaneously varied in their position on the arms $a'$ or $a^2$ or both, as the case may be, by means of screwed rods, levers, slides and the like, or in such a manner that each intermediate lever $a$ will impart a like amount of movement to each pivot-hole attachment $k$ and thus control the length of stroke of the reciprocating bearer plate $f$ which together with its concomitants actuates and controls the length of stroke of the ram member R.

One convenient method of carrying into effect the variation in the length of stroke of the ram member R is by providing an extension piece $a^4$ (Figures 14 and 15) on one arm $a'$ of each of the two intermediate levers $a$ and on each extension piece $a^4$ a lever $n$ of L-form is pivotally mounted so that one arm $n'$ thereof is slidably connected through the medium of I-bars $o$ (Figure 18) to a trunnioned ring piece $p$ which embraces and partially rotates on an internally threaded part $q'$ (Figure 19) of a bracket slide $q$ which is slidably mounted in guides $r'$ on a bracket guide piece $r$ integral with or affixed to the frame $c$ of the press and the other arm $n^2$ of the lever $n$ of L-form is pivotally connected through the medium of a link $n^3$ to the hereinbefore referred to pivot-hole attachment $k$ which is slidably mounted in guides $a^3$ on the extension piece $a^4$ of the said arm $a'$ of the said intermediate lever $a$.

When the intermediate lever $a$ is oscillated the said trunnioned ring piece $p$ partially rotates around the extension of the part $q'$ of the bracket slide $q$ which parts $q'$ shown in Figures 14 and 15 of the drawings, are screw threaded so that one will engage with a left-hand thread $m'$ and one will engage with a right-hand thread $m^2$ of a right and left-hand screw threaded and rotatably mounted shaft $m$ which passes through a hollow fulcrum shaft $b$ and the said shaft $m$ is prevented from making longitudinal movement in the shaft $m$ and in the frame $c$ of the press by means of thrust collars $m^3$ or the like which to accomplish this, are mounted on the said shaft $m$ in any known manner.

When the screw threaded shaft $m$ as shown in Figures 14 and 15 of the drawings is rotated in one direction it causes the bracket slides $q$ to move and slide on each of the bracket guide pieces $r$ towards each other at an equal speed of sliding movement, but when the said shaft $m$ is rotated in an opposite direction it causes the bracket slides $q$ to move away from each other at an equal speed of sliding movement, this movement constrains each of the said levers $n$ of L-form to move the pivot-hole attachments $k$ so that they are either nearer to, or further away from the fulcrums $b$ of the said intermediate levers $a$ and in such a manner that the length of the stroke of the ram member R and of the reciprocating bearer plate $f$ is either lessened or increased. For turning the said screw threaded shaft $m$, so that it rotates in the hollow fulcrum shaft $b$ and in the internally threaded parts $q'$ of the bracket slides $q$ in such a manner that the movement or stroke of the ram member R can be accurately set or regulated and the length of stroke thereof determined as well as the position in which the pressure stroke of the ram member R terminates, a wheel $m^4$, scored or graduated around its periphery or other suitable part, is preferably employed.

In moving by mechanical means the pivot-hole attachments $k$ on the arms $a'$ or $a^2$ of the intermediate levers $a$ so that the said attachments $k$ are brought nearer to or further away from the fulcrums $b$ of such intermediate levers $a$, it is not essential that a hollow fulcrum shaft $b$ with a right and left-hand screw threaded shaft $m$ rotatably mounted therein should be employed and an equivalent mechanism for moving the pivot-hole attachments $k$ and the levers $n$ of L-form, as shown in Figures 14 and 15 of the drawings, is illustrated in Figures 16 and 17 of the drawings which show how the bracket slides $q$ can be moved along the bracket guide pieces $r$ simultaneously through the medium of two elbow levers or their equivalents $s$, hereinafter called the elbow levers $s$. which to do this are pivotally mounted to a stationary part of the press. One arm $s'$ of each elbow lever $s$ is pivotally attached to a screw threaded control slide $t$ optionally through the medium of links $s^3$ and each other arm $s^2$ of each of the said elbow levers $s$ is coupled in each case through the medium of a link $s^4$ to a bracket slide $q$ on which the hereinbefore referred to part $q'$ is integrally formed. The bracket slide part is not, in this case, internally screw threaded, but has a trunnioned ring piece $p$ embracing it, in the manner hereinbefore described, so that the lever $n$ of L-form can be moved thereby and so control the movement of the pivot-hole attachment $k$ to which it is coupled.

The elbow levers $s$, links $s^3$ and $s^4$ and the control slide $t$ are so arranged that when movement is given to the control slide $t$ it is imparted through each of the elbow levers $s$ and their concomitants to the said bracket slides $q$. The said control slide $t$ is mounted in guides $t'$ provided on any suitable part of the press and is operated by a screw threaded rod or shaft $m^5$ which is mounted in the press in a known manner so as to be free to revolve, but not free to make longitudinal movement and a wheel, handle or the like $m^4$, which is optionally scored or graduated in any known manner, is provided to rotate the said screw threaded rod or shaft $m^5$. In operation, the movement imparted from the control slide $t$ through the elbow levers $s$ to the bracket slides $q$ is in turn transmitted through the levers $n$ of L-form to the pivot-hole attachments k located on each co-operating intermediate lever $a$ in the manner and for the purpose hereinbefore referred to.

Where screw threaded rods such as $m$ or $m^5$, levers $n$ of L-form, elbow levers $s$, links $s^3$ and $s^4$ or the like equivalents are employed according to this invention, to move the pivot-hole attachments $k$, the bracket slides $q$, the control slide $t$ and the other slidably mounted attachments referred to herein, then the movement of, or a variation in the length of the stroke of the ram member R and of the reciprocating bearer plate $f$ can be effected, through the medium of one or more of the said intermediate levers $a$ and the concomitants to which they are pivotally connected, whilst the press is working or in motion.

Where one or more intermediate levers $a$ are employed according to this invention, an alteration can be effected in the position where the ram member R of a press completes its pressure stroke or to where it finishes such pressure stroke away from the bolster $u$ of the said press, by changing the position of the fulcrum or of the fulcrums $b$ of the intermediate levers $a$ either before or whilst the press is working or in motion as shown in Figures 20, 21, and 22 of the drawings and a convenient way to change the position of each fulcrum $b$ about which each intermediate lever $a$ oscillates, is to attach the said fulcrum $b$ on, or form it as part of a so-called wrist plate, or as a throw on a shaft, as illustrated for example in Figure 24 of the drawings, and in such a manner that it can be adjusted or moved in a concentric path around the axis of such wrist plate or shaft, which, to effect this is partially rotated by one or more levers $b^2$, or by gearing, or the like equivalents of the known kinds and so alters the position of the said fulcrum $b$, which effects a variation in the distance of the said ram member R away from the bolster $u$ of the press; or the fulcrums of the intermediate levers $a$ may be mounted on a slide $b^3$, slidably mounted in guides $b^4$ on the frame $c$, or any fixed part of the press as shown in Figure 23 of the drawings, in which the slide $b^3$ is operated by a screw threaded member $b^5$ which engages therein and moves and carries the fulcrum $b$ with it.

Where a lever such as $b^2$ is employed to partially rotate the wrist plate, or a shaft $b'$, then the lever $b^2$ is at one end thereof provided with a forked or like part $b^6$ which embraces an internally screw threaded part $b^7$ rotatably mounted on a screw threaded eye rod or a trunnioned rod $m^6$ and such screw threaded part $b^7$ is rotated by a wheel or the like such as $m^4$ and so moves the lever $b^2$ and in turn the wrist plate or shaft $b'$ as shown in Figures 20, 21 and 22 of the drawings.

In operation the intermediate levers $a$ shown in Figures 5 and 6 of the drawings permit the arm $d$ of the auxiliary toggle mechanism to be moved, as shown in dotted lines, to another pivot-hole $h$, of which there may be several, to shorten the stroke of the reciprocating bearer plate, and the said intermediate lever $a$ also permits the coupling link $g$ to be moved, as shown in dotted lines in Figure 6 of the drawings, to another pivot-hole $h'$ in the arm $a^2$ of the intermediate lever $a$ which would still further shorten the stroke; the effect of this alteration being that the ram member R always arrives at the end of its pressure stroke at the nearest position it can approach towards the bolster $u$, but the said ram member R does not recede so far away from the bolster $u$ as is the case when a stroke the full ambit of travel of the ram member R is made.

The arm $a'$ of the intermediate lever $a$ shown in Figure 7 of the drawings operates in a like manner to the arm $a'$ shown in Figures 3 and 4 of the drawings; but it will be observed that as the arm $a^2$ is in this case pivotally attached to the reciprocating bearer plate $f$, any variation in the stroke thereof and of the ram member R is entirely obtained as the result of varying the pivotal position of the arm $d$ of the auxiliary toggle mechanism on the arm $a'$ of the intermediate lever $a$.

The various figures of the drawings only illustrate presses which are of the vertical type, but the invention is equally applicable to presses of any type in which one or more intermediate levers $a$ can be interposed as elements between any known form of cranked member $v$ and a reciprocating bearer plate $f$ or its equivalent. In presses as shown in Figures 1, 2 and 20 of the drawings where the arms $d$ of the auxiliary toggle mechanism are straight, or in line when the ram member R is at the top of its stroke, the pivotal position of the arm $d$ on the arm $a'$ of the intermediate lever $a$ is not advantageously varied. Where a connecting rod, such as the rod $e$ shown in Figures 25 and 26 is employed, it is used merely as a substitute for the auxiliary toggle mechanism. Where such a connecting rod is used in the presses shown in Figures 1, 2 and 22 and is pivotally connected to the outer end of the intermediate lever $a$, such connecting rod shortens the normal stroke of the ram member R as compared with the stroke of said member if operated by the auxiliary toggle mechanism shown in Figures 1, 2, and 22.

The arm $a'$ of the intermediate lever $a$ shown in Figures 3, 4, 5, and 6 of the drawings, permits the arm $d$ of the auxiliary toggle mechanism to operate therein or to be pivotally connected thereto, as shown in dotted lines, and so shorten the stroke of the reciprocating bearer plate $f$, but the said intermediate levers $a$ shown in Figures 3 and 4 of the drawings also permit the coupling link $g$ to be moved on the arm $a^2$ thereof to any position thereon within the ambit of the curved guide on the said arm $a^2$, or until the said coupling link $g$ arrives at the no-movement position, if desired, as shown in dotted lines in Figure 4 of the drawings; the coupling links $g$ in Figures 5 and 6 are moved and operate in a like manner to those shown in Figures 1 and 2 of the drawings.

The press shown in Figure 8 of the drawings has the arm $a^2$ of the intermediate lever $a$ pivotally connected to the reciprocating bearer plate $f$ and no variation in the stroke thereof can be made by the said arm $a^2$, the arm $a'$ however is provided with a mechanically controlled and slidably mounted pivot-hole attachment $k$ which is moved, as desired, so that it slides nearer to or further away from the fulcrum $b$ of the intermediate lever $a$ and thus permits of an infinity of variation being made between the maximum and the minimum movement it imparts to the reciprocating bearer plate $f$, such movement being greatest when the pivot-hole attachment $k$ is nearest to the fulcrum $b$ and least when it is farthest away therefrom, and although in Figures 8, 14 and 15 of the drawings the pivot-hole attachment $k$ is illustrated located on the side of the arm $a'$ nearest to the centre joint of the auxiliary toggle mechanism, it will be obvious that the pivot-hole attachment $k$ is equally applicable when slidably mounted on the other side of the arm $a'$, particularly for coupling an auxiliary toggle mechanism of the kind shown in Figures 1 and 2 of the drawings which pulls instead of pushes the arm $a'$, and in the event of the pivot-hole attachment $k$ not being slidably mounted in a suitable manner on the correct side or face of the arm $a'$, it pulls out of its guides when operated by the toggle arms arranged as shown in Figure 2 of the drawings.

Figures 20 and 22 of the drawings illustrate presses in which the fulcrum $b$ of the intermediate lever $a$ can be adjustably moved, so that whilst the press is in operation the edge pressure plates can be brought to a vertical position, or they can be arrested before becoming vertical, or at right angles to the reciprocating bearer plate $f$ and thus vary the distance that the ram member R is kept away from the bolster $u$ when it has completed, or is at the end of its pressure stroke. By the employment of one or more intermediate levers $a$ in a press or other pressure exerting machine it will be obvious that either a long or short stroke of the ram member R of the said press or other machine, within the ambit of variation permitted by the intermediate lever $a$, can be obtained without altering the stroke of the cranked driving element $v$ of such press, and the use of means in the form of an intermediate lever or levers $a$, whereby a variation from a short stroke to a long stroke, or vice versa, in a press or other pressure exerting machine which is employed for pressing, stamping, forging, swaging, thicknessing, re-pressing, heading, embossing or the like, is a great advantage to the industries interested.

In Figure 22 of the drawings it will be observed that although the toggle arms are in the position where the ram member R would normally be at the bottom of its stroke and the edge pressure plates vertical or straight, that this has not occured due to the fact that the fulcrum $b$ and the lever $b^2$ have been moved from the position occupied in Figure 20 of the drawings to the position shown in Figure 22 of the said drawings; but if the lever $b^2$ and the fulcrum $b$ were moved still further so as to carry the said fulcrum $b$ nearer to the inside of the column of the press on which it is mounted, by moving the screwed wheel $m^4$ towards the end of the screw threaded part $m^6$ then the said reciprocating bearer plate $f$ and the edge pressure plates can be brought to the same position as shown in Figure 20 of the drawings or varied the full extent of the stroke.

I claim:—

1. In a press, a frame, oscillatory members on opposite sides of the frame respectively, driving members for imparting movement to the said oscillatory members, sliders mounted on the oscillatory members for connecting the said driving members thereto, and means extending from side to side of the frame for simultaneously adjusting the positions of the said sliders.

2. In a press, a frame, oscillatory members on opposite sides of the frame respectively, driving members for imparting movement to the said oscillatory members, sliders mounted on the oscillatory members for connecting the said driving members thereto, bell cranks connecting the sliders to sliders movable in alignment on opposite sides of the frame, and a screw acting through the bell cranks to move the sliders on opposite sides of the frame simultaneously.

3. A press comprising a frame, a ram movable in the frame, a reciprocatory bearer plate, edge pressure plates interposed between the reciprocatory bearer plate and the ram, an oscillatory lever connected to the bearer plate, means for transmitting motion to the oscillatory lever, a pin connecting the oscillatory lever to the bearer plate and means for sliding the said pin progressively along the said oscillatory lever.

4. A press comprising an oscillatory lever, a reciprocatory bearer plate connected thereto, means for transmitting motion to the oscillatory lever, a pin supporting the oscillatory lever, a rotatable member mounted in the frame of the press and supporting the said pin eccentrically thereon, means for imparting rotary movement to the rotatable member, and means for holding the rotatable member and pin in any position to which they may be moved.

5. A press comprising an oscillatory lever, a reciprocatory bearer plate connected thereto, means for transmitting motion to the oscillatory lever, a pin supporting the oscillatory lever, a rotatable member mounted in the frame of the press and carrying the said pin eccentrically thereon, an arm secured to the rotatable member and a nut and screw device for moving the arm and holding the arm in any position to which it is thus moved.

6. A press comprising an oscillatory lever, a reciprocatory bearer plate connected thereto, means for transmitting motion to the oscillatory lever, a pin forming a connection between the oscillatory lever and bearer plate, a slider carrying the pin and a nut and screw device for moving the slider along the said oscillatory lever and holding the slider in any position to which it is thus moved.

FRANK HUMPHRIS.